(12) United States Patent
Kikuchi et al.

(10) Patent No.: US 6,353,233 B1
(45) Date of Patent: Mar. 5, 2002

(54) CLEANING SHEET FOR CLEANING BILL IDENTIFICATION UNIT

(75) Inventors: Tetsuro Kikuchi; Shigeru Yasuda, both of Tsurugashima; Yuichi Sakamoto, Higashimatsuyama, all of (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 0 days.

(21) Appl. No.: 09/395,680

(22) Filed: Sep. 13, 1999

(30) Foreign Application Priority Data

Sep. 14, 1998 (JP) ............................................. 10-260131

(51) Int. Cl.[7] .............................. G06K 5/00; A46B 9/02; A46B 1/00
(52) U.S. Cl. ........................................ 250/556; 15/160
(58) Field of Search ............................ 250/221, 222.1, 250/556; 235/375, 379, 381, 493; 359/71; 15/104.5, 104.51, 104.52, 104.53, 117, 118, 214, 104.93, 210.1, 105, 160

(56) References Cited

U.S. PATENT DOCUMENTS

| | | | | |
|---|---|---|---|---|
| 5,040,160 A | * | 8/1991 | Moriya .......................... | 369/71 |
| 5,088,083 A | * | 2/1992 | Olson ........................... | 369/71 |
| 5,525,417 A | * | 6/1996 | Eyler ........................... | 428/286 |
| 5,824,611 A | * | 10/1998 | Eyler ........................... | 442/401 |
| 5,832,556 A | * | 11/1998 | Eyler ........................ | 15/104.93 |
| 6,156,407 A | * | 12/2000 | Neubauer et al. ............. | 428/90 |

\* cited by examiner

*Primary Examiner*—Seungsook Ham
*Assistant Examiner*—Eric Spears
(74) *Attorney, Agent, or Firm*—Hogan & Hartson, LLP

(57) ABSTRACT

In a cleaning sheet for cleaning a bill identification unit comprising bill identification sensors, a brush part is formed on the surface of a main sheet body of the cleaning sheet so that when the brush part passes through bill identification sensors, the brush part cleans the bill identification sensors and concave portions where the bill identification sensors are embedded so that even a non-contact type bill identification sensor disposed slightly retreated from the surface of a bill transporting route can be cleaned.

4 Claims, 11 Drawing Sheets

CLEANING SHEET FOR CLEANING BILL IDENTIFICATION UNIT

BACKGROUND OF THE INVENTION

1. Field of the Invention

The present invention relates to a cleaning sheet for cleaning a bill identification unit disposed in a bill processor, and more particularly to a cleaning sheet for a bill identification unit used for cleaning a bill identification sensor of a bill identification unit.

2. Description of the Related Art

Generally, an automatic vending machine is equipped with a bill processor which judges the genuineness of an inserted bill, storing the bill if it is judged as genuine and returning the bill if it is judged as counterfeit. The bill processor includes a bill identification unit for judging the genuineness of the inserted bill.

Such a bill identification unit comprises, as its main components, various bill identification sensors such as a photosensor, which detects light and shade or gradation of color and other data on the bill without making contact with the bill, and a magnetic sensor, which contacts the bill and slides thereon to detect the magnetism of the bill.

When an inserted bill passes through the bill identification unit provided inside the bill processor, the genuineness of the bill is judged by the above mentioned bill identification sensors, and the bill is stored in a stacker equipped in the bill processor if judged as genuine, or is returned through a bill slot if judged as counterfeit.

These various bill identification sensors of the bill identification unit, however, may drop identification capability when they are contaminated due to long term use. To prevent the drop in capability, periodic maintenance and inspection operation, such as cleaning of each bill identification sensor, is necessary.

To perform this maintenance and inspection operation of the bill identification unit, the bill processor must be disassembled so that each of the bill identification sensors of the bill identification unit is exposed, and then each exposed identification sensor is carefully cleaned using such a tool as a cotton swab.

To clean the bill identification unit, it is necessary that the bill processor is disassembled to expose each sensor of the bill identification unit, and an operator cleans using such a tool as a cotton swab, as mentioned above, which makes the maintenance and inspection operation extremely complicated.

One available method to ease the complicated nature of the maintenance and inspection operation is inserting a bill-shaped cleaning sheet into a bill inlet slit, and passing it through the bill identification unit during which the bill identification sensors of the bill identification unit are cleaned. However, since this conventional cleaning sheet removes contamination by sliding on sensors, only a bill identification sensor of a type which contact with a bill and slides on the bill, such as a magnetic head, can be cleaned. However, for a bill identification sensor such as a photosensor, which is disposed such as to be slightly retreated from the surface of the bill transporting route and identifies the genuineness of a bill without contact, the surface of the cleaning sheet does not reach the sensor. As a consequence, such a bill identification sensor which identifies a bill without contact cannot be cleaned by the cleaning sheet. Therefore, the bill processor must be disassembled to exposed the sensor, and the exposed sensor is cleaned by such a tool as a cotton swab, as in the conventional method. Thus, a complicated maintenance and inspection operation cannot be improved by using the cleaning sheet.

SUMMARY OF THE INVENTION

With the foregoing in view, it is an object of the present invention to provide a cleaning sheet for a bill identification unit which can easily clean even if a non-contact type bill identification sensor is slightly retreated from the surface of a bill transporting route.

To solve the above problem, according to the present invention, a cleaning sheet for cleaning a bill identification unit having a bill identification sensor embedded in a concave portion of a chute surface constituting a bill transporting route, the bill identification unit judging genuineness of a bill passing through the bill identification sensor, comprises a main sheet body of approximately the same shape as a bill; and a brush part which is planted vertically from a surface of the main sheet body at a position facing the bill identification sensor, when the brush part passes through the bill transporting route, wherein the brush part slides on the bill identification sensor when the brush part passes through the bill identification sensor so as to clean the bill identification sensor and the concave portion.

DESCRIPTION OF THE PREFERRED EMBODIMENTS

Embodiments of the cleaning sheet for a bill identification unit in accordance with the present invention will now be described.

Figure 1:
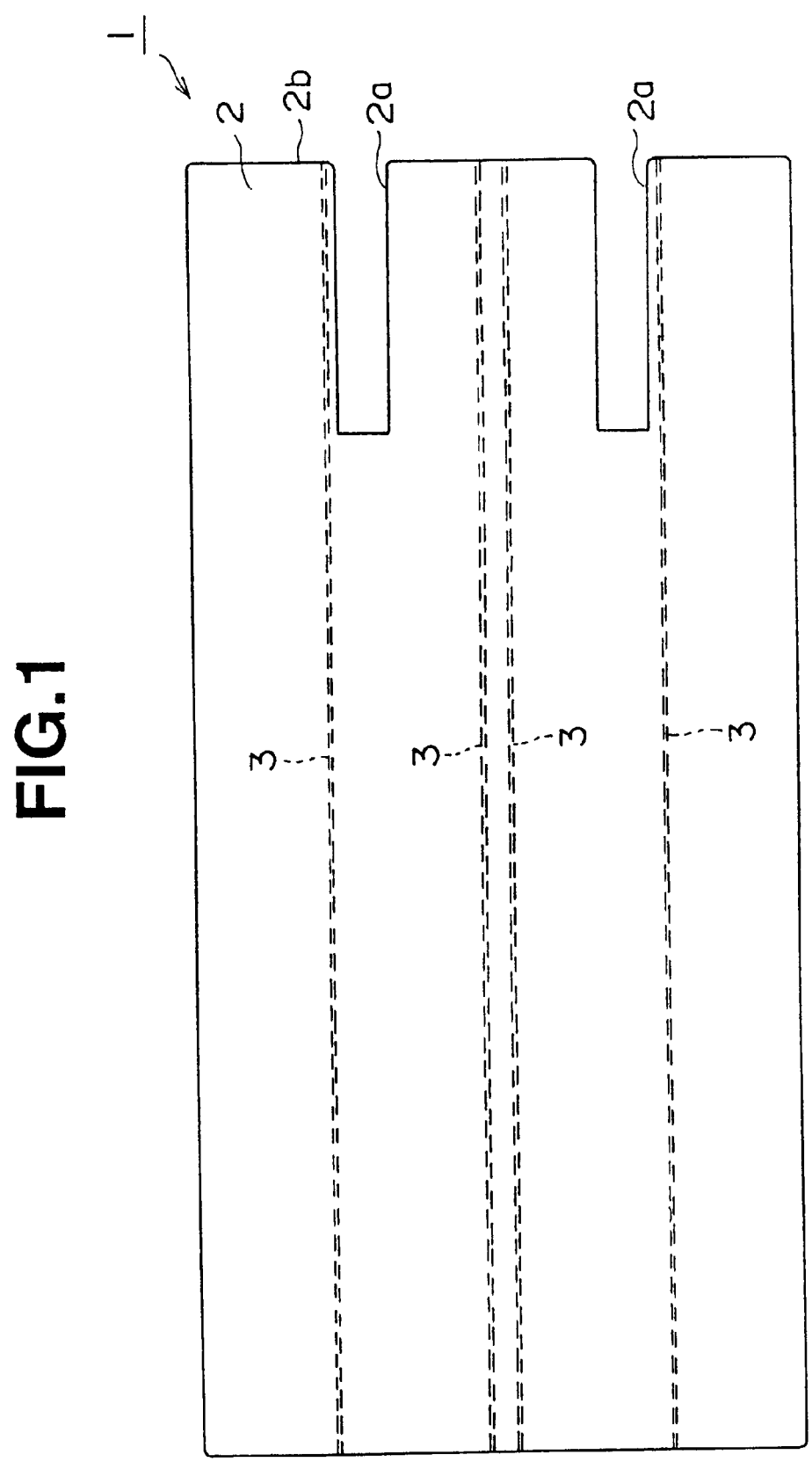
FIG. 1 is a plan view of a cleaning sheet in accordance with an embodiment of the present invention.

FIG. 1 is a plan view depicting a cleaning sheet for a bill identification unit 1 in accordance with an embodiment of the present invention.

Figure 2:
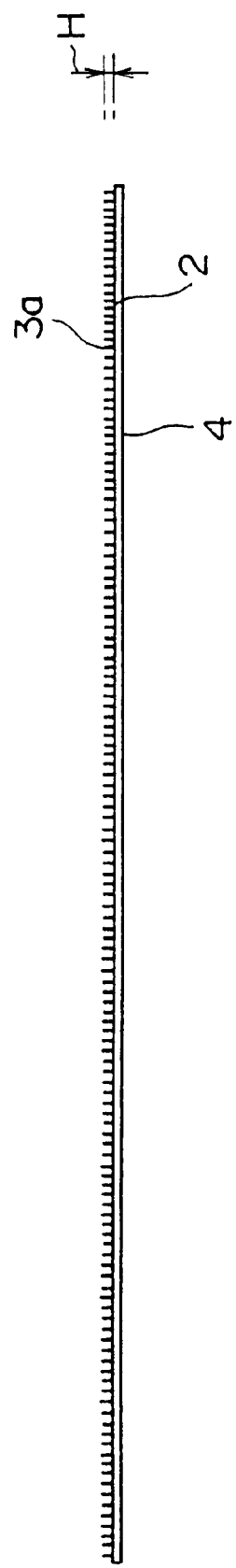
FIG. 2 is a side view of the cleaning sheet of FIG. 1.

The cleaning sheet 1 comprises a main sheet body 2 which is formed in approximately the same shape as a bill to be used and, as shown in FIG. 2, brush parts 3 which are planted on the surface of the main sheet body 2 and formed vertically from the surface of the main sheet body 2. As shown in FIG. 1, at the fore edge 2b of the main sheet body 2 at locations corresponding to the bill transporting belt constituting bill transporting means of the bill identification unit, which is described later, a pair of notches 2a are formed to avoid contact with the bill transporting belt.

Figure 3:
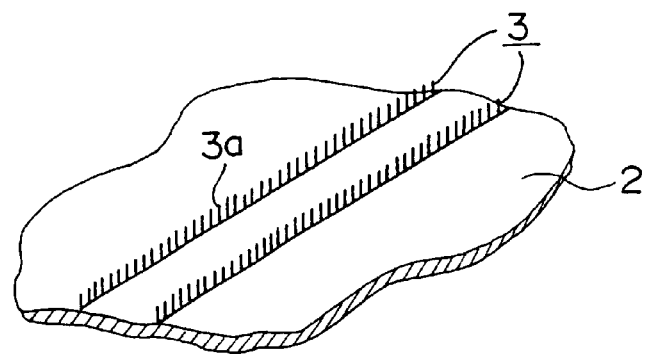
FIG. 3 is a perspective view of a key part of the cleaning sheet of FIG. 1.

As shown in FIG. 3, which is an enlarged perspective view of a key part of FIG. 1, each brush part 3 comprises brushes 3a, which are formed in two rows. As shown in FIG. 2, in this embodiment each brush 3a of the brush parts 3 (brush parts 3 are shown in FIG. 3) is made from such fibers as nylon and acrylic copper sulfide, and the height H is set to approximately 1.5 mm (sheet thickness: approximately 0.5 mm). The brush part 3 is formed at four locations in the longitudinal direction of the main sheet body 2, as shown in FIG. 1, and the pitch, which is the space between brush parts, is set to the pitch of the later mentioned photosensors which are bill identification sensors disposed in the bill identification unit.

As shown in FIG. 3, which is an enlarged perspective view of a key part of FIG. 1, each brush part 3 comprises brushes 3a, which are formed in two rows.

As shown in FIG. 2, the main sheet body 2 is made from a flexible material primarily composed of polyester fibers, and a flexible sheet material 4 comprised of black polyethylene terephthalate (PET) is attached to the back face of the main sheet body 2 so that the main sheet body 2 is opaque where light is not transmitted.

The bill identification unit will now be described.

Figure 4:
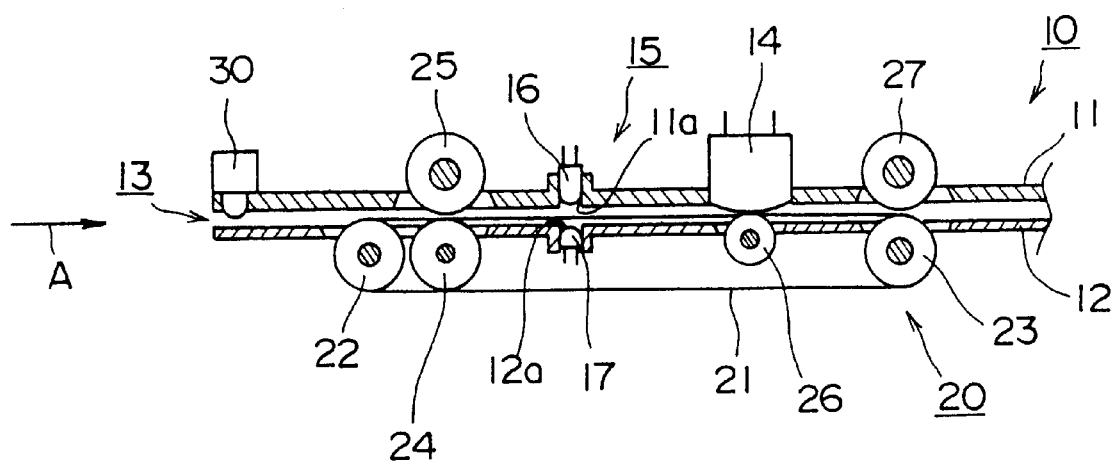
FIG. 4 is a conceptual cross-sectional view of a bill identification unit.

FIG. 4 is a side view depicting a key part of the bill identification unit 10.

The bill identification unit 10 comprises a top and bottom chutes 11 and 12 which are disposed at a predetermined space, and a bill transporting route 13 is formed between these chutes.

A magnetic head 14 constituting a contact type bill identification sensor of the bill identification unit 10 is disposed in the top chute 11, and a photosensor 15 constituting a non-contact type bill identification sensor is disposed at a position adjacent to the magnetic head 14 in the side where a bill, not illustrated here, is inserted (arrow A side).

The photosensor 15 comprises a light emitting element 16 and a light receiving element 17 which are disposed facing each other at a predetermined space, where the light emitting element 16 is embedded in a concave portion 11 the top chute 11, and the light receiving element 17 is embedded in a concave portion 12a of the bottom chute 12.

In the top and bottom chutes 11 and 12, bill transporting means 20 for transporting a bill that is guided into the bill transporting route 13, is disposed.

The bill transporting means 20 comprises a looped bill transporting belt 21 disposed on the surface of the bottom chute 12, and a pair of pulleys 22 and 23, on which the bill transporting belt 21 is wound. When one of the pulleys 22 or 23 is driven by driving means, such as a motor, not illustrated here, the bill transporting belt 21 rotates clockwise or counterclockwise, and the bill which is guided into the bill transporting route 13 is transported along the bill transporting route 13.

Reference numeral 24 in FIG. 4 is an idle pulley for guiding the transporting belt 21, and a pressure roller 25 is disposed at a location facing the idle pulley 24. Further, pressure rollers 26 and 27 are also disposed at a location facing the magnetic head 14 and at a location facing the other pulley 23, respectively. At the edge of the top chute 11 of the bill identification unit 10, an inlet sensor 30 comprising an optical sensor for detecting the presence of an inserted bill is disposed.

Figure 5:
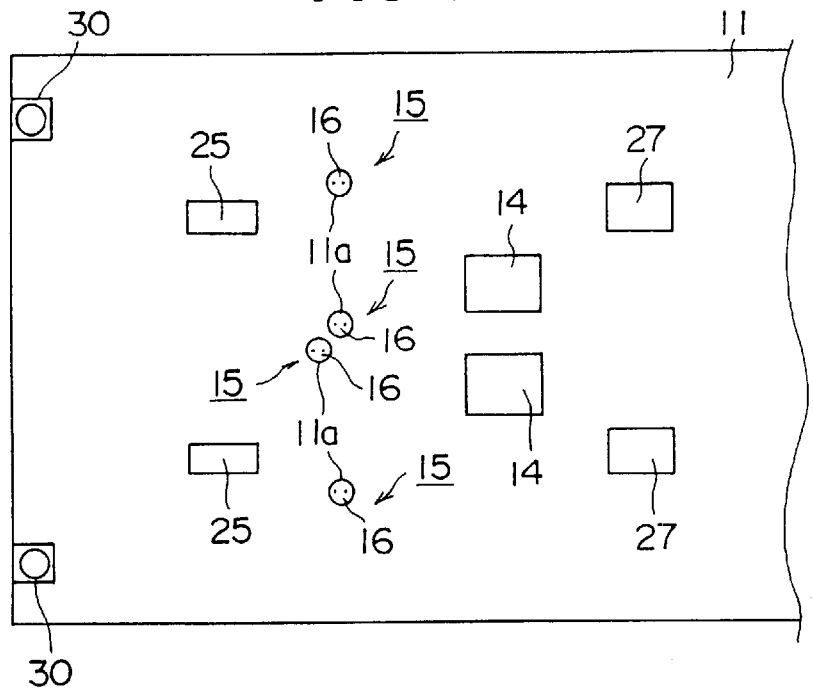
FIG. 5 is a plan view of a top chute.

Referring to FIG. 5 that is a plan view of the top chute 11, among the above mentioned constituting elements, the magnetic head 14 is disposed at two locations in the width direction of the bill transporting route 13 (not shown in FIG. 5 but shown in FIG. 4), and the pressure rollers 26 and 27 are disposed at two locations in the width direction of the bill transporting route. Further the inlet sensor 30 for detecting the presence of an inserted bill is also disposed at two locations in the width direction of the bill transporting route 13 (not shown in FIG. 5 but shown in FIG. 4).

Light emitting elements 16 of photosensors 15, on the other hand, are disposed at four locations in the width direction of the bill transporting route 13 (not shown in FIG. 5 but shown in FIG. 4) at a predetermined pitch.

Figure 6:
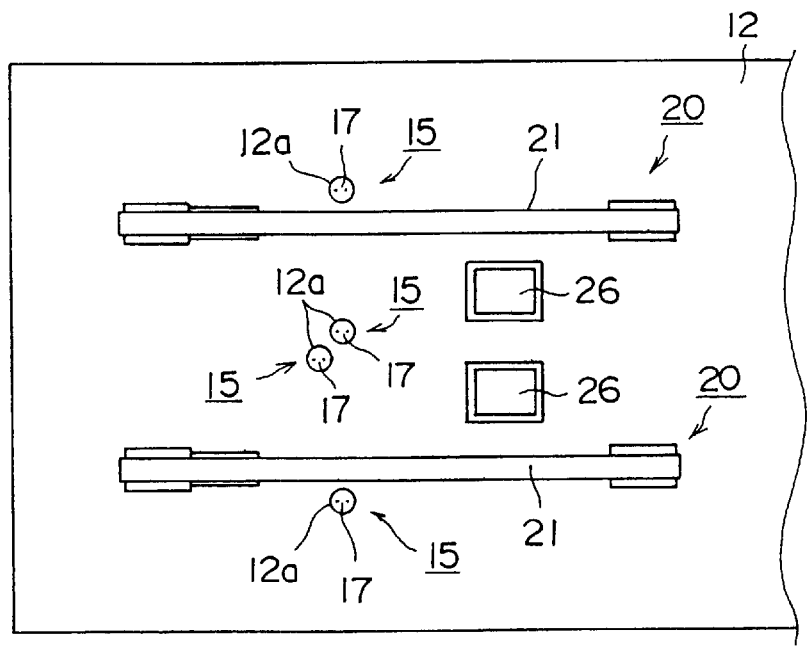
FIG. 6 is a plan view of a bottom chute.

As the plan view of the bottom chute 12 in FIG. 6 shows, a pressure roller 26, which is facing the magnetic head 14, is also disposed at two locations in the width direction of the bill transporting route 13. A bill transporting belt 21 of the bill transporting means 20 is also disposed at two locations in the width direction of the bill transporting route 13 at a predetermined space.

Further, light receiving elements 17 of the photosensors 15 are disposed at four locations in the width direction of the bill transporting route 13 at a predetermined pitch.

Now the operations of the cleaning sheet 1 will be described with reference to the flow chart in FIG. 7 and FIG. 8.

Figure 7:
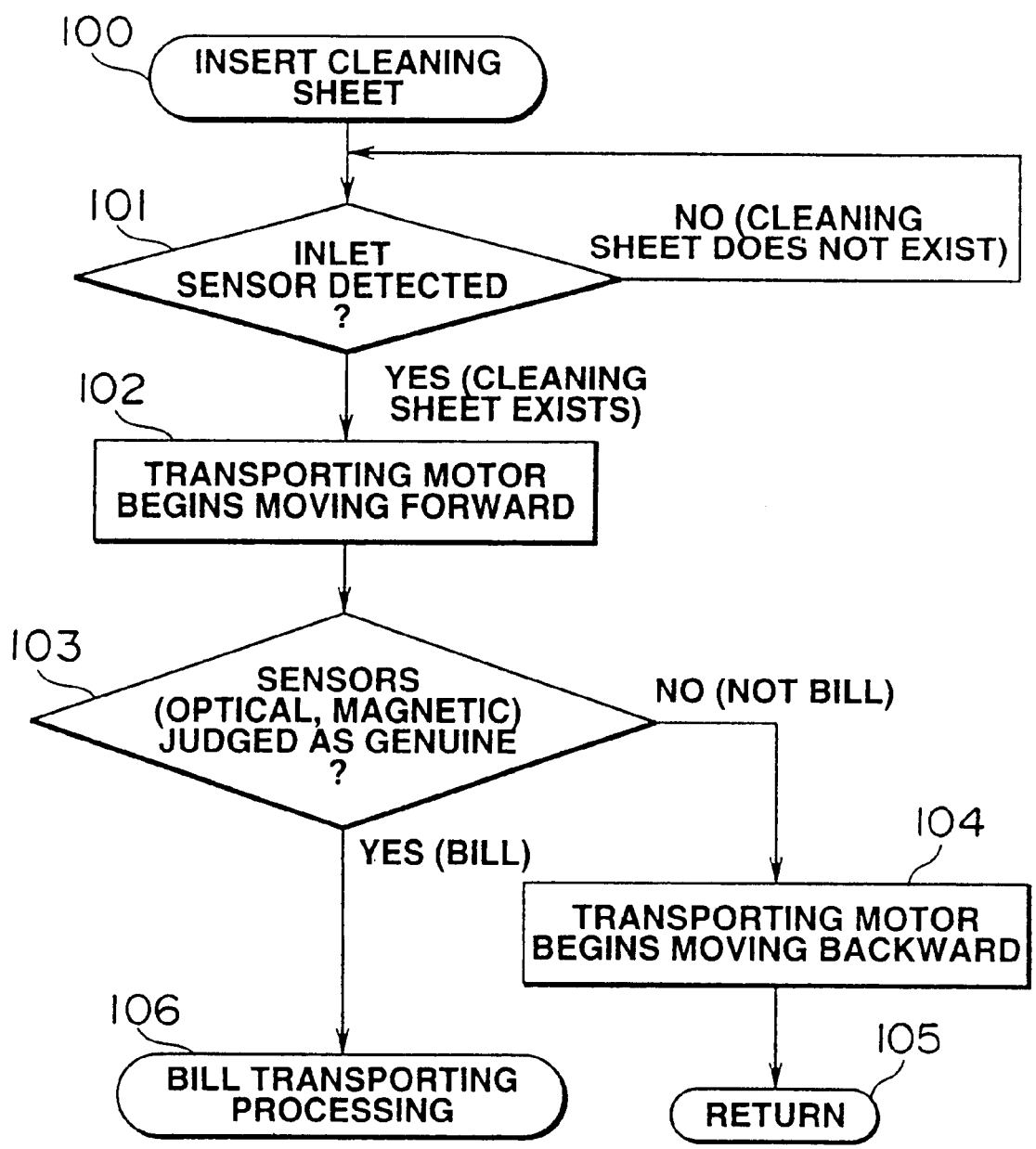
FIG. 7 is a flow chart depicting the cleaning procedure of the cleaning sheet
Figure 8:
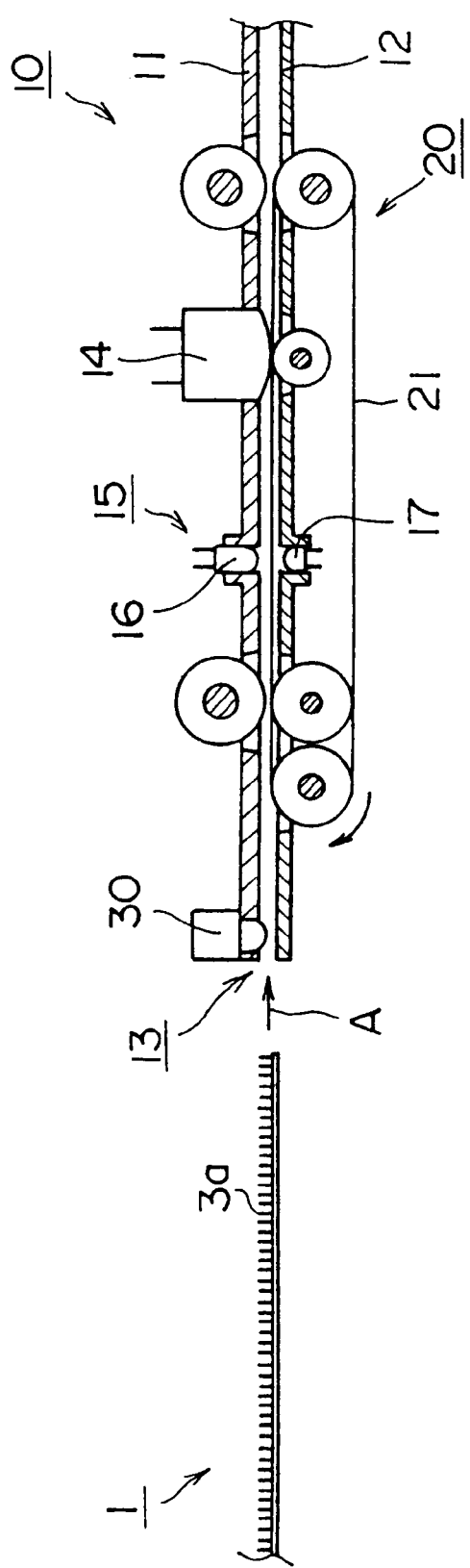
FIG. 8 is a conceptual cross-sectional view of the bill processor depicting the cleaning procedure of the cleaning sheet.

At first, as FIG. 8 shows, the cleaning sheet 1 is inserted into the bill transporting route 13, as indicated by arrow A, with the brush 3 a face up (Step 10 in FIG. 7).

Then, the edge of the cleaning sheet 1 is detected by the inlet sensor 30 shown in FIG. 8 (Step 101 in FIG. 7).

When the inlet sensor 30 detects the insertion of the bill, a transporting motor, not illustrated here, begins moving forward based on the detection signal (Step 102 in FIG. 7) and the transporting belt 21 of the bill transporting means 20, shown in FIG. 8, rotates clockwise.

Figure 9:
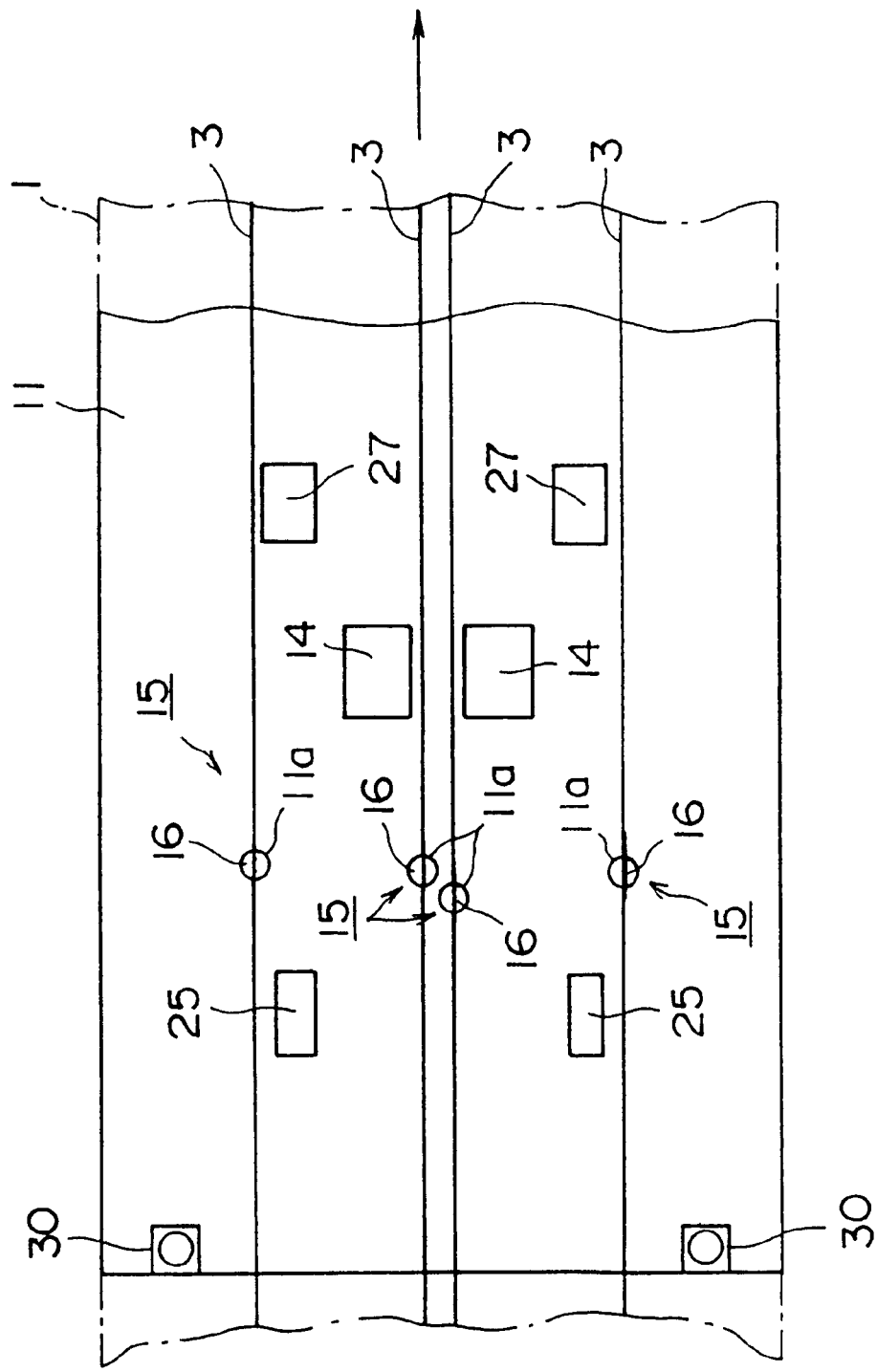
FIG. 9 is a plan view of the top chute depicting the cleaning procedure of the cleaning sheet.

Then, the cleaning sheet 1 is transported to the bill transporting route 13 by the rotation of the bill transporting belt 21 in FIG. 8. During this time, the brush parts 3 of the cleaning sheet 1 slide on the concave portions 11a of the top chute 1 and the light emitting elements 16 of each photosensor 15 embedded therein, as shown in FIG. 9. Thus, the brushes 3a shown in FIG. 3 deeply enter the concave portions 11a and clean such contamination as dust attached therein.

While the cleaning sheet 1 passes through the magnetic sensor 14 and the photosensor 15 of the bill identification unit 10, each sensor 14 and 15 judges whether the cleaning sheet 1 is a genuine bill, and since it clearly is not, these sensors 14 and 15 judge that the cleaning sheet 1 is not a genuine bill (counterfeit) (Step 103 in FIG. 7).

Then, the transporting motor, not illustrated here, begins rotating backward (Step 104 in FIG. 7), rotates the transporting belt 21 of the bill transporting means 20 shown in FIG. 8 counterclockwise, and returns the transported cleaning sheet 1 (Step 105 in FIG. 7).

If the magnetic sensor 14 and the photo sensor 15 judge erroneously the cleaning sheet 1 as a genuine bill in Step 103 in FIG. 7, then normal bill transporting processing, such as storing in a stacker, not illustrated here, is executed (Step 106).

In the above embodiment, flexible sheet material 4 made from black polyethylene terephthalate (PET) is attached to the back face of the main sheet body 2, as shown in FIG. 2, so that the cleaning sheet 1 will not be judged as a genuine bill by the sensors 14 and 15.

In the above embodiment, the cleaning sheet 1 is inserted into the bill transporting route 13 in the arrow A direction with the brushes 3a face up, as shown in FIG. 8, so as to clean the light emitting elements 16 of the photosensors 15 disposed in the top chute 11 and the concave portions 11a where the light emitting elements 16 are embedded. On the other hand, to clean the light receiving elements 17 of the photosensors 15 disposed in the bottom chute 12 and the concave portions 12a where the light receiving elements 17 are embedded, the cleaning sheet 1 is inserted into the bill transporting route 13 in the arrow A direction with the brushes 3a face down, which is the opposite of the state in FIG. 8.

Figure 10:
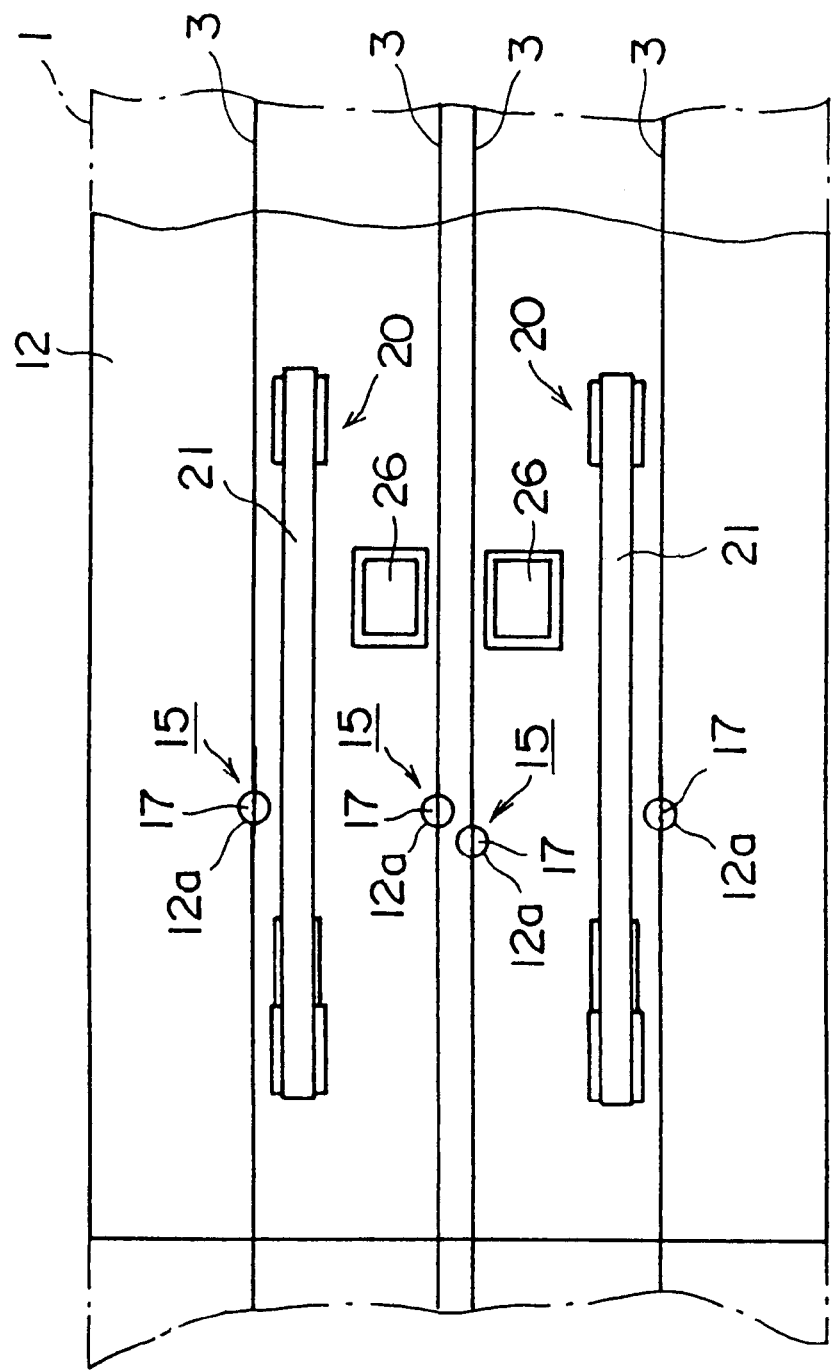
FIG. 10 is a plan view of the bottom chute depicting the cleaning procedure of the cleaning sheet.
Figure 11:
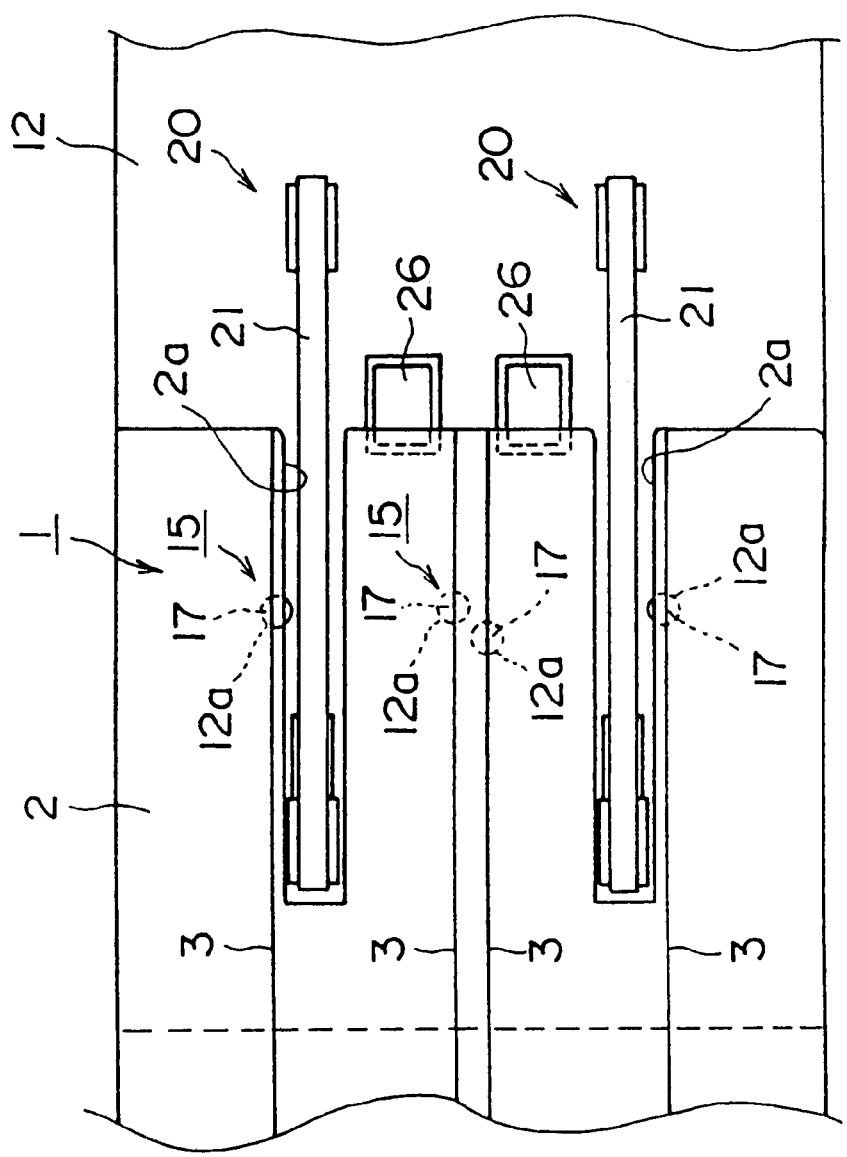
FIG. 11 is a plan view depicting a function of the notches of the cleaning unit.

When the cleaning sheet 1 is inserted into the bill transporting route 13 in the arrow A direction, shown in FIG. 8, with the brush parts 3 face down, the brush parts 3 of the cleaning sheet 1 slide on the concave portions 12a of the bottom chute 12 and the light receiving elements 17 of each photosensor 15 embedded therein, as shown in FIG. 10. As a result, the brushes 3a of the brush parts 3 deeply enter into the concave portions 12a and clean such contamination as dust attached therein.

When the bill transporting means 20 of the bill transporting belt 21 does not start moving due to an abnormality of the bill identification unit 10, the cleaning sheet 1 cannot be transported. On that occasion, the cleaning sheet 1 is forcibly inserted into the bill transporting route 13 avoiding the part of the bill transporting belt 21 by using the notches 2a, so that the brush parts 3 slide on and clean the photosensors 15.

In the above embodiment, the brush parts 3 are formed on one side of the main sheet body 2, as shown in FIG. 2. However, the present invention is not restricted by the above embodiment. The brush parts 3 may be formed on both sides of the main sheet body 2 facing each other, and in this case, both of the light emitting elements and the light receiving elements 16 and 17 of the photosensor 15 can be cleaned by one insertion of the cleaning sheet 1.

Further, in the above embodiment, the photosensor 15 was used as an example of a non-contact type bill identification sensor. However, the present invention is not restricted by the above embodiment, and can be applied to cleaning various non-contact type bill identification sensors, such as infrared ray lamps.

Figure 12:
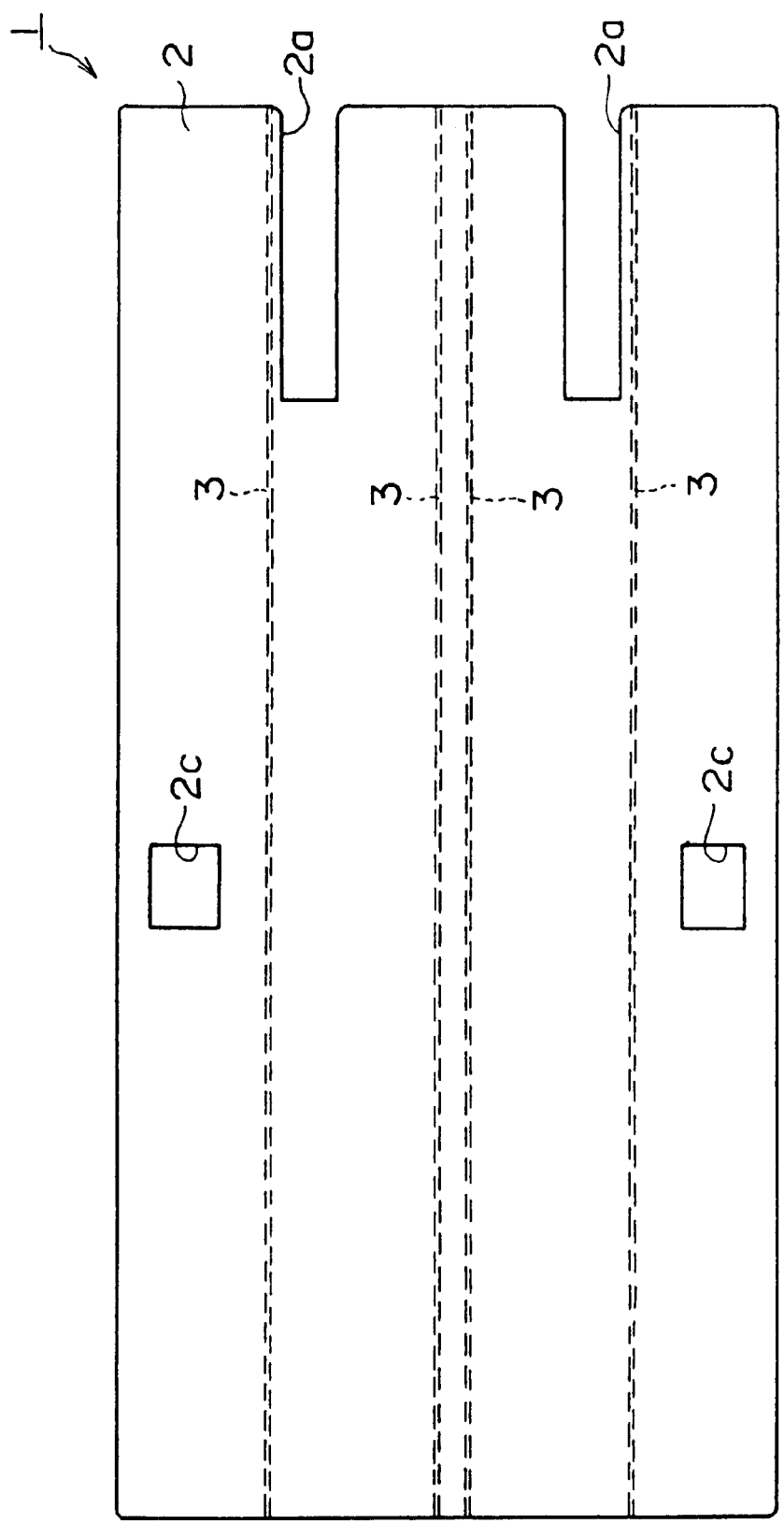
FIG. 12 is a plan view depicting another embodiment of the cleaning sheet.

Also, as shown in FIG. 12, which uses the same numerals and signs for the same parts in FIG. 1, a pair of holes 2c may be formed in the cleaning sheet 1 at positions facing the inlet sensor 30 shown in FIG. 5 and at positions shorter than an ordinary bill.

By forming the pair of holes 2c in the cleaning sheet 1 and at positions shorter than an ordinary bill in this manner, the edge of an inserted bill is detected by the inlet sensor 30, shown in FIG. 5, at a position shorter than an ordinary bill. As a result, the inserted bill can be judged as counterfeit and returned immediately.

As a consequence, with the pair of holes 2c formed in the main sheet body 2 of the cleaning sheet 1, it becomes unnecessary to attach the flexible sheet material 4 made from black polyethylene terephthalate (PET), shown in FIG. 2, since the inserted cleaning sheet 1 is always judged as counterfeit and is returned.

Figure 13:
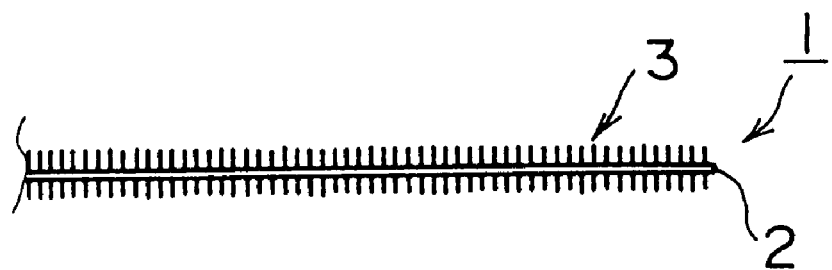
FIG. 13 is a side view depicting a key part of another embodiment of the cleaning sheet.
Figure 14:
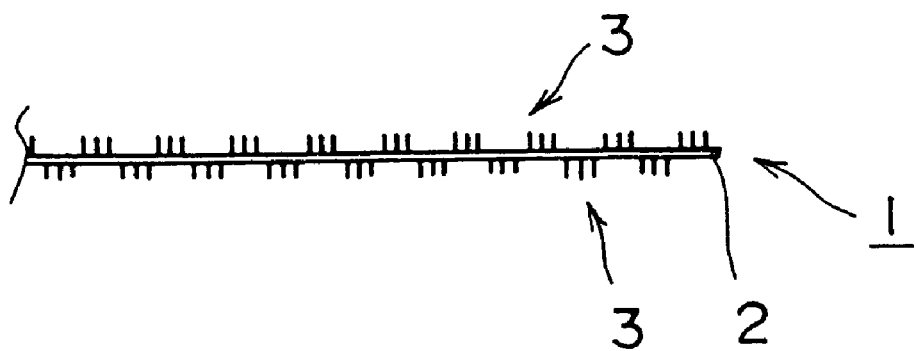
FIG. 14 is a side view depicting a key part of another embodiment of the cleaning sheet.

The brush parts 3 formed on the main sheet body 2 may be formed simply on both sides, as shown in FIG. 13, or may be alternately formed on both sides, as shown in FIG. 14.

In the explanation on the above embodiment, only the brush parts 3 have a cleaning function for the bill identification sensors. However, the present invention is of course not restricted by the above embodiment, and it may be so constructed that the surface of the main sheet body 2, other than the brush parts 3, slides on the contact-type bill identification sensor, such as the magnetic head 14, so that the surface of the main body serves to clean the contact-type bill identification sensor.

As described above, in the cleaning sheet for cleaning a bill identification unit in accordance with the present invention, the brush parts are formed on the surface of the main sheet body at positions facing the photosensors of the bill identification unit, and the cleaning sheet is passed through the bill identification unit so that the brush parts clean the concave portions where non-contact type bill identification sensors such as photosensors are embedded. Therefore, even non-contact type bill identification sensors that are disposed slightly retreated from the surface of the bill transporting route can be easily cleaned in a simple operation, which makes the maintenance and inspection operation of the bill identification unit extremely easy.

The invention may be embodied in other specific forms without departing from the spirit or essential characteristics thereof. The present embodiment is therefore to be considered in all respects as illustrative and non-restrictive. The scope of the invention is indicated by the claims rather than the foregoing descriptions. All variations and changes which come within the meaning and range of equivalent claims are therefore intended to be embraced therein.

What is claimed is:

1. A cleaning sheet for cleaning a bill identification unit having a bill identification sensor embedded in a concave portion formed in a surface of a chute constituting a bill transporting route, the bill identification unit judging genuineness of a bill passing through the bill identification sensor, comprising:

a main sheet body of approximately the same shape as a bill; and a brush part which is planted vertically from a surface of the main sheet body at a position facing the bill identification sensor, when the brush part passes through the bill transporting route, wherein the brush part slides on the bill identification sensor so as to clean the bill identification sensor and the concave portion, and wherein the bill identification unit further comprises bill transporting means comprising a bill transporting belt, and the main sheet body of the cleaning sheet has notches on a fore edge to avoid contact of the bill transporting belt of the bill transporting means.

2. The cleaning sheet for cleaning a bill identification unit according to claim 1, wherein the bill identification sensor is a non-contact type photosensor.

3. The cleaning sheet for a bill identification unit according to claim 1, wherein the brush part is planted on one of top and bottom faces of the main sheet body.

4. The cleaning sheet for a bill identification unit according to claim 1, wherein the brush part is formed on both the top and bottom faces of the main sheet body.

* * * * *